(No Model.)

S. STEPHENS.
RENDERING APPARATUS.

No. 282,584. Patented Aug. 7, 1883.

WITNESSES:
C. E. Davis
H. P. Hood.

INVENTOR:
Samuel Stephens

UNITED STATES PATENT OFFICE.

SAMUEL STEPHENS, OF INDIANAPOLIS, INDIANA, ASSIGNOR TO SINKER, DAVIS & CO., OF SAME PLACE.

RENDERING APPARATUS.

SPECIFICATION forming part of Letters Patent No. 282,584, dated August 7, 1883.

Application filed June 29, 1883. (No model.)

*To all whom it may concern:*

Be it known that I, SAMUEL STEPHENS, a citizen of the United States, residing at Indianapolis, in the county of Marion and State of Indiana, have invented a new and useful Improved Apparatus for Rendering Lard and other Fats, of which the following is a specification.

My invention relates to that class of rendering apparatus in which the animal substances are placed in a vertical cylindrical vessel heated by steam and the fats drawn off at the bottom.

The objects of my improvements are, first, to bring the animal substances into contact with a large amount of heating-surface; second, to provide a substitute for the coils of steam-pipes heretofore used in this class of apparatus, in which the joints will be less liable to become leaky from expansion and contraction; third, to so arrange the pipes for the introduction of the steam and the pipes for drawing off the condense-water that the steam will not pass through the condense-water, and thereby lose a portion of its heat.

The accompanying drawings illustrate my invention.

Figure 2:
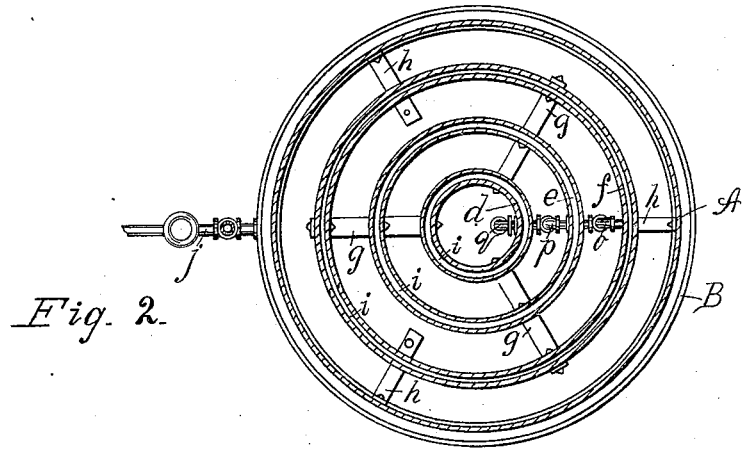
Figure 1:
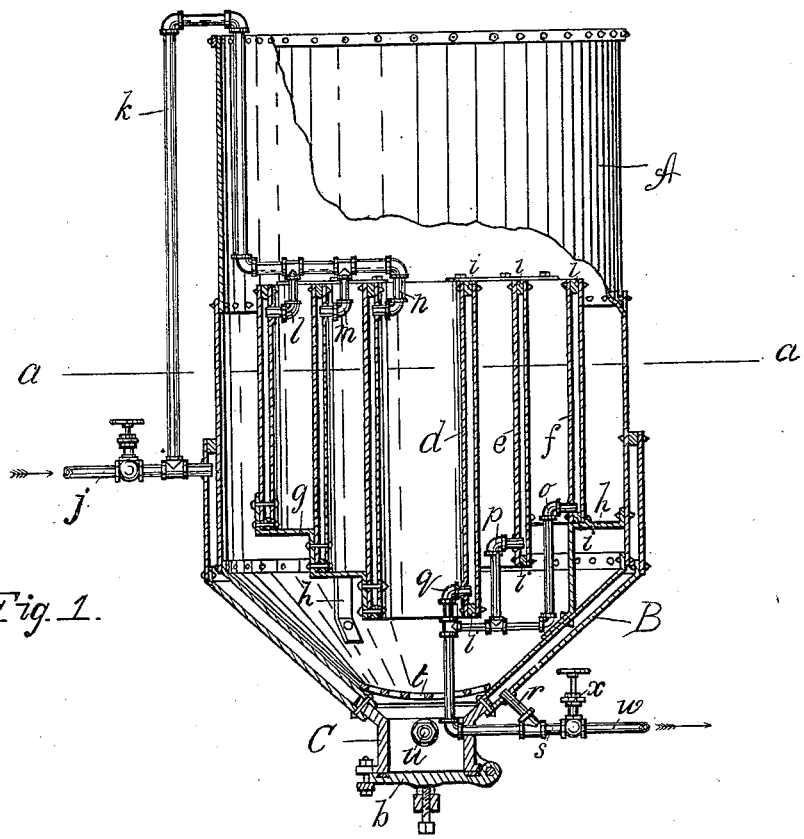

Figure 1 is a vertical section. Fig. 2 is a transverse section at *a a*.

Like letters refer to the same parts in both views.

A is a cylindrical tank, with converging sides at the lower end, made of boiler-iron. The lower part of said tank is inclosed in a steam-tight jacket, B. A cylindrical casting, C, is riveted to the lower end of tank A, to which casting is hinged a drop-cover, *b*, which closes the opening. Arranged concentrically within tank A are a series of double-walled cylinders, *d e f*. Said cylinders are shorter than tank A, are open at both ends, and are held in position by braces *g g g* and *h h h*, the former being fastened to the cylinders and the latter to the inside of the tank. It will be thus observed that a clear space is thus left in the tank above and below the cylinders. The double walls of the cylinders *d, e,* and *f* are separated and the space between them made steam-tight by hoops *i i*, riveted in at the top and bottom. *j* is a steam-pipe, which enters jacket B near the top. *k* is also a steam-pipe, conveying steam through branches *l m n* to the tops of the spaces between the double walls of the cylinders *d e f*. *o p q r* are waste-pipes entering a pipe, *s*, for drawing off the condense-water from the cylinders and jacket B. *t* is a strainer, and *u* an outlet for drawing off the lard.

The operation of my apparatus is as follows: Animal fatty matter is put into tank A and cylinders *d e f* until the tops of *d, e,* and *f* are covered. Steam is then admitted through pipes *j* and *k* to steam-jacket B and cylinders *d e f*. Said cylinders, owing to their construction and their being unconfined at the top, are free to expand without straining their joints. The fatty matter being distributed in small separate masses in the annular spaces between the cylinders, is brought in contact with a large heating-surface, and is speedily reduced, and the fat or lard is drawn off from time to time through the outlet *u*. As the steam becomes condensed the water falls to the bottom of the steam-spaces and is drawn off through pipes *o, p, q,* and *r*, which are all connected with waste-pipe *w*, in which a valve, *x*, is placed, which may be of the ordinary form, or a steam-trap may be used instead. After the lard has been drawn off, the residue is extracted by opening drop-cover *b*.

I claim as my invention—

1. In a rendering apparatus, the combination, with a cylindrical tank, of a series of cylinders of different diameters, having double walls and arranged concentrically within said tank, with annular spaces between them, substantially as shown and described.

2. In a rendering apparatus, the combination, with a tank having a portion of its length formed with double walls and a steam-space between them, and series of cylinders having double walls and a steam-space between said walls and arranged within said tank, with annular spaces between them, of a means of introducing steam at the top of said steam-spaces and means for drawing off the condense-water from the bottom of said steam-spaces, substantially as and for the purpose specified.

SAMUEL STEPHENS.

Witnesses:
C. E. DAVIS,
H. P. HOOD.